United States Patent Office 2,951,868
Patented Sept. 6, 1960

2,951,868
3,5-DINITRO-o-TOLUIC ACID HYDRAZIDES

Guy H. Harris, Concord, and Bryant C. Fischback, Walnut Creek, Calif., assignors to The Dow Chemical Company, Midland, Mich., a corporation of Delaware No Drawing. Filed Oct. 30, 1958, Ser. No. 770,578

6 Claims. (Cl. 260—558)

This invention is directed to 3,5-dinitro-o-toluic acid hydrazides corresponding to the formula

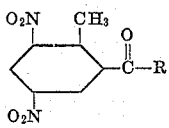

In this and succeeding formulae, R represents hydrazino, methylhydrazino, dimethylhydrazino, or trimethylhydrazino. These new hydrazide compounds are crystalline solids which are somewhat soluble in many organic solvents such as acetone and dioxane and of low solubility in water. They have been found to be useful as parasiticides and are adapted to be employed as active toxic constituents of compositions for the control of a number of helminth, insect, fungal and protozoan organisms such as Mexican bean beetles, *Alternaria solani*, *Eimeria tenella*, and *Eimeria necatrix*.

The novel 3,5-dinitro-o-toluic acid hydrazides corresponding to the formula

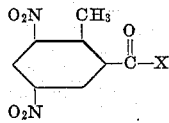

wherein X represents hydrazino, 2-methylhydrazino, dimethylhydrazino or trimethylhydrazino may be prepared by causing a reaction between a lower alkyl ester of 3,5-dinitro-o-toluic acid and a hydrazine corresponding to the formula, R—H, or their hydrates. The reaction conveniently is carried out in an organic solvent as reaction medium and preferably in the alcohol employed in the preparation of the lower alkyl ester of 3,5-dinitro-o-toluic acid. Good results are obtained when employing substantially equimolecular proportions of the reactants although the employment of a small excess of the hydrazine reagent is usually preferred. The reaction takes place smoothly at temperatures of from 30° to 120° C. with the production of the desired product. When a lower aliphatic alcohol is employed as reaction medium, it is convenient to carry out the reaction at the boiling temperature of the reaction mixture and under reflux.

In carrying out the reaction, the lower alkyl 3,5-dinitro-o-toluate and hydrazine reagents are dispersed in the reaction medium and the resulting mixture maintained for a period of time at a temperature of from 30° to 120° C. During the course of the reaction, the desired product may precipitate in the reaction mixture as a crystalline solid. Upon completion of the reaction, the reaction mixture may be cooled to precipitate the desired product or to precipitate further product, which may be separated by filtration. The separated product may be further purified by conventional methods.

In an alternative method, 1,1-dimethyl-2-(3′,5′-dinitro-o-toluic acid) hydrazide, 1,2-dimethyl-1-(3′,5′-dinitro-o-toluic acid) hydrazide and 1,1,2-trimethyl-2-(3′,5′-dinitro-o-toluic acid) hydrazide may be prepared by reacting 3,5-dinitro-o-toluyl chloride with dimethylhydrazine or trimethylhydrazine. The reaction takes place smoothly at temperatures of from 15° to 100° C. with the production of the desired product and the hydrochloride of the employed hydrazine reactant. Good results are obtained when one molecular proportion of the 3,5-dinitro-o-toluyl chloride is reacted with two molecular proportions of the hydrazine reagent. The reaction is carried out in a water immiscible organic solvent as reaction medium and preferably in a medium in which the desired product is soluble but the hydrochloride byproduct is insoluble such as dioxane. In carrying out the reaction, the 3,5-dinitro-o-toluyl chloride is added portionwise to the hydrazine reagent dispersed in the reaction medium. Upon completion of the reaction, the reaction mixture may be washed with water or filtered to separate hydrochloride by-product, and the reaction medium removed from the filtrate by evaporation to obtain the desired product as a crystalline solid. The product may be further purified by conventional procedures such as washing with water and recrystallization from various organic solvents.

The novel 3,5-dinitro-o-toluic acid hydrazides corresponding to the formula

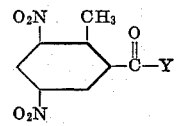

wherein Y represents hydrazino, 1-methylhydrazino, dimethylhydrazino or trimethylhydrazino may be prepared by causing a reaction between 3,5-dinitro-o-toluic acid anhydride and a hydrazine corresponding to the formula, RH, or their hydrates. The reaction is carried out in an organic solvent as reaction medium such as dioxane. Good results are obtained when employing substantially equimolecular proportions of the reactants. The reaction takes place smoothly at temperatures of from 15° to 80° C. with the production of the desired product and 3,5-dinitro-o-toluic acid of reaction. In carrying out the reaction, the anhydride is added portionwise with stirring to the hydrazine reagent dispersed in the solvent. Upon completion of the reaction, the reaction mixture may be diluted with dilute aqueous alkali metal hydroxide to convert the 3,5-dinitro-o-toluic acid by-product to its water soluble salt. During the dilution, the desired product usually precipitates in the reaction mixture as a crystalline solid. Following the dilution, the reaction mixture may be cooled to precipitate the desired product or to precipitate further product, which may be separated by filtration and purified by conventional procedures.

The following examples merely illustrate the invention and are not to be construed as limiting.

*Example 1.—3,5-dinitro-o-toluic acid hydrazine*

Methyl 3,5-dinitro-o-toluate (19.8 grams; 0.82 mole) and 8.24 grams (0.16 mole) of the hydrazine hydrate were dispersed in 150 milliliters of methanol, and the resulting mixture heated at the boiling temperature and under reflux for 18 hours. The reaction mixture was then cooled to 0° C. During the cooling, a 3,5-dinitro-o-toluic acid hydrazide product precipitated in the reaction mixture as a crystalline solid. This product was separated by filtration and recrystallized from methanol. The recrystallized product melted at 177.6°–178.2° C., and had carbon, hydrogen and nitrogen contents of 40.09, 3.37 and 23.34 percent, respectively, as compared to theoretical contents of 40.0, 3.36 and 23.33 percent.

In an exactly similar manner, 0.1 mole quantities of ethyl 3,5-dinitro-o-toluate and methylhydrazine are reacted together in ethanol to obtain a 1-methyl-2-(3',5'-dinitro-o-toluic acid) hydrazide product as a crystalline solid having a molecular weight of 216.

*Example 2.—1,1-dimethyl-2-(3',5'-dinitro-o-toluic acid) hydrazide*

3,5-dinitro-o-toluyl chloride (24.4 grams; 0.1 mole) was dissolved in dioxane and the resulting mixture added portionwise to 15 grams (0.25 mole) of 1,1-dimethylhydrazine dispersed in a small amount of dioxane. The addition was carried out over a period of 15 minutes and at room temperature. Following the addition, the reaction mixture was filtered to separate 1,1-dimethylhydrazine hydrochloride and the dioxane removed from the filtrate by evaporation to obtain a 1,1-dimethyl-2-(3,5-dinitro-o-toluic acid) hydrazide product as a crystalline solid. This product was recrystallized from ethanol and found to melt at 170°–172° C., and to have carbon, hydrogen and nitrogen contents of 44.88, 4.60 and 20.80 percent, respectively, as compared to theoretical contents of 44.79, 4.51 and 20.88 percent.

*Example 3.—1,2-dimethyl-1-(3',5'-dinitro-o-toluic acid) hydrazide*

3,5-dinitro-o-toluyl chloride (10 grams; 0.048 mole) was added portionwise over a period of about five minutes to 6 grams (0.12 mole) of 1,2-dimethylhydrazine dispersed in 150 milliliters of benzene, and the resulting mixture heated at the boiling temperature and under reflux for one hour. The reaction mixture was then cooled to room temperature. During the cooling, a solid product precipitated in the reaction mixture. This product was separated by filtration, the separated product dissolved in chloroform and the chloroform solution washed with water to remove 1,2-dimethylhydrazine hydrochloride. The chloroform was then removed by evaporation and the residue twice recrystallized from benzene. As a result of these operations, there was obtained a 1,2-dimethyl-1-(3',5'-dinitro-o-toluic acid) hydrazide which melted at 141° C. and had carbon, hydrogen and nitrogen contents of 45.35, 4.25 and 20.79 percent, respectively, as compared to theoretical contents of 44.78, 4.51 and 20.89 percent.

*Example 4.—1-methyl-1-(3',5'-dinitro-o-toluic acid) hydrazide*

One tenth mole of 3,5-dinitro-o-toluic acid anhydride (melting at 240° C.) is added portionwise with stirring to 0.1 mole of methylhydrazine dispersed in 100 milliliters of dioxane. The addition is carried out at room temperature and over a period of 10 minutes. Stirring is thereafter continued and the temperature of the reaction mixture raised to 40° C. and maintained at this temperature for twenty minutes. Following the latter period, the reaction mixture is diluted with dilute aqueous sodium hydroxide, cooled and thereafter filtered to obtain a 1-methyl-1-(3',5'-dinitro-o-toluic acid) hydrazide product as a crystalline solid having a molecular weight of 216.

The compounds of the present invention have been found to be useful as parasiticides and as anthelminthics for the control of gastro-intestinal parasites in animals. In such use, the unmodified compounds may be employed or a composition containing the compounds in admixture with an edible liquid or a finely divided solid such as alcohol, syrups, edible oils, grain rations, feed concentrates or animal feeds. The products may likewise be employed as constituents of aqueous dispersions of oil-in-water emulsions with or without the addition of surface active dispersing agents. In representative operations, the feeding as a sole ration to chickens of a commercial poultry mash containing 0.03 percent by weight of 3,5-dinitro-o-toluic acid hydrazide gives substantially complete controls of *Eimeria necatrix* and cecal coccidiosis in the birds.

The alkyl 3,5-dinitro-o-toluates employed as starting materials in accordance with the teachings of the present invention may be prepared by the esterification of 3,5-dinitro-o-toluic acid with a lower alkanol. The 3,5-dinitro-o-toluyl chlorides employed as starting materials as herein described may be prepared by the reaction of 3,5-dinitro-o-toluic acid with thionyl chloride ($SOCl_2$) or phosphorus pentachloride to produce the acid chloride. The 3,5-dinitro-o-toluic acid anhydride employed as a starting material as herein described may be prepared by the reaction of 3,5-dinitro-o-toluic acid with 3,5-dinitro-o-toluyl chloride.

We claim:

1. A compound corresponding to the formula

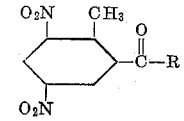

wherein R represents a member of the group consisting of hydrazino, methylhydrazino, dimethylhydrazino and trimethylhydrazino.

2. 3,5-dinitro-o-toluic acid hydrazide.
3. 1,1,2-trimethyl-2-(3',5'-dinitro-o-toluic acid) hydrazide.
4. 1,2-dimethyl-1-(3',5'-dinitro-o-toluic acid) hydrazide.
5. 1-methyl-1-(3',5'-dinitro-o-toluic acid) hydrazide.
6. 1,1-dimethyl-2-(3',5'-dinitro-o-toluic acid) hydrazide.

References Cited in the file of this patent

Sah et al.: Chem. Ab., vol. 43 (1949), p. 6972.
Curtius: J. Prakt. Chem., vol. 76 (1907), pp. 238–63.